United States Patent Office 3,357,971
Patented Dec. 12, 1967

3,357,971
MIXED CELLULOSE ETHERS
Eugene D. Klug, Wilmington, Del., assignor to Hercules Incorporated, a corporation of Delaware
No Drawing. Filed July 6, 1964, Ser. No. 380,686
14 Claims. (Cl. 260—215)

The present invention relates to mixed cellulose derivatives, and more particularly to hydroxypropyl cellulose containing an ionic substituent and having unexpected beneficial properties. Considered another way, the present invention relates to a hydroxypropyl cellulose having unexpected beneficial properties by virtue, in part at least, of ionic substituent groups having been introduced to a limited degree of substitution (D.S.).

My copending application Serial No. 257,064, now Patent No. 3,278,521, filed on February 8, 1963, and entitled, "Hydroxypropyl Cellulose and Process," discloses and claims a novel hydroxypropyl cellulose. Surprisingly, the hydroxypropyl cellulose of said copending application is characterized by the following desirable properties:

(1) Soluble in cold water.
(2) Insoluble in hot water.
(3) Thermoplastic.
(4) Soluble in a large number of polar organic solvents.
(5) Low equilibrium moisture content.

In solubility in hot water is a distinct and important advantage in that it permits purification with hot water to a low ash content as compared with purification with aqueous organic liquids which not only have the disadvantage of being far more expensive but they complicate the process because they must be recovered. Furthermore, even with large amounts of organic solvents, an ash content as low as with hot water cannot be obtained. However, this hot water insolubility of the hydroxypropyl cellulose product restricts its use, because in certain applications the hydroxypropyl cellulose must remain in solution at elevated temperatures.

An object of the present invention is to modify the hydroxypropyl cellulose product disclosed and claimed in my above-identified copending application in such a way to substantially increase the temperature at which it remains soluble in water and at the same time maintain the above-mentioned other desirable properties of said hydroxypropyl cellulose. A further object is to provide a mixed cellulose derivative containing hydroxypropyl substituent and ionic substituent characterized by having the unexpected and desired properties of the hydroxypropyl cellulose disclosed and claimed in my above-identified copending application and at the same time being soluble in hot water at a substantially higher temperature than said hydroxypropyl cellulose.

The above and other objects are accomplished in accordance with the present invention by making a mixed water-soluble cellulose derivative by carrying out the process which comprises reacting cellulosic material with a hydroxypropylating agent and a second agent which imparts ionic character to said cellulose derivative until the product has an ionic D.S. of 0.001–0.4 and a hydroxypropyl M.S. of at least 2, and recovering the mixed cellulose derivative.

For the sake of brevity the following designations will be used sometimes hereinafter: CM is carboxymethyl, HP is hydroxypropyl, MCA is monochloroacetic acid, DEAE is diethylaminoethyl, and TBA is tertiary butyl alcohol.

The purpose of the following paragraph is to explain the use herein and in the prior art of the terms "degree of substitution" ("D.S.") and "M.S."

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl, sulfoalkyl, sulfate, dialkylaminoalkyl, carboxyalkyl, or acyl derivatives of cellulose, the D.S. and M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

The substitution values of the modified hydroxypropyl cellulose derivatives of the present invention were analyzed as follows. The derivatives containing carboxyl groups were purified in the free acid form and the carboxyl substitutions were determined by titration to the phenolphthalein end point of the base. The sulfonic acid and sulfate substitutions were determined by analysis for sulfur content. The dialkylaminoalkyl substitutions were determined by analysis for nitrogen content.

The following examples illustrate various embodiments of the present invention but they are not intended to limit the invention beyond the scope of the appended claims. In these examples and elsewhere herein, unless otherwise indicated, percent and parts are by weight and all viscosities were determined with a standard Brookfield Synchro-Lectric LVF viscometer using an aqueous solution of the cellulose derivatives of the concentration specified and at a temperature of 25° C. The cellulose derivatives of the present invention may be prepared by introducing into cellulose the hydroxypropyl substituent and the ionic substituent in any order desired, but it is preferred to introduce the hydroxypropyl and ionic substituents in the same step or to introduce the ionic substituent and then the hydroxypropyl substituent.

In these examples a measure of the hot water solubility of the mixed cellulose derivatives was obtained from the opaque temperature. The value for the opaque temperature was obtained by raising the temperature of a 1% or 2% aqueous solution of the product at a rate of 1.5° C.– 2° C. per minute. This was done in a test tube in which a thermometer was immersed. The lowest temperature at which the solution became opaque was recorded as the opaque temperature.

Sodium hydroxide was used to adjust the pH of the aqueous solutions of the mixed cellulose derivatives, except the diethylaminoethyl hydroxypropyl cellulose was adjusted with acetic acid.

The following Examples 1–5 illustrate the preparation of the mixed cellulose derivatives of the present invention by hydroxypropylating low substituted ionic cellulose derivatives. The carboxymethyl cellulose was prepared in accordance with Klug and Tinsley U.S. Patent No. 2,517,577.

EXAMPLES 1–5—2-STEP REACTION

*Example 1.—Carboxymethyl hydroxypropyl cellulose*

One part of finely divided carboxymethyl cellulose (having a D.S. of 0.18 and thus being insoluble in water) was slurried in 2.35 parts TBA, 8.6 parts hexane and 0.1 part water. 0.2 part of 50% aqueous NaOH was added to the slurry. The slurry was stirred for an additional hour at room temperature, after which it was transferred to a pressure vessel to which 3.0 parts propylene oxide was added. The pressure vessel was sealed and the mixture was heated at 70° C. for 16 hours. Agitation was employed throughout the process.

At the end of the reaction, part of the alkali was neutralized by adding 0.1 part acetic acid. Most of the hexane was removed by decanting and the remaining hexane was distilled off by contacting the product with live steam.

The carboxymethyl hydroxypropyl cellulose product was added in small amounts to vigorously stirred water at 85° C.–95° C., the pH being maintained at 3.0 by incrementally adding $H_3PO_4$ of 85% concentration. After all of the carboxymethyl hydroxypropyl cellulose had been added, the resulting slurry was stirred for an additional 15 minutes and then the pH adjusted to 3.0. Upon discontinuing the agitation of the slurry, the carboxymethyl hydroxpropyl cellulose product settled out quickly and the water was removed by decanting. The purification of the carboxymethyl hydroxypropyl cellulose product was completed by subjecting it to three additional steps comprising slurrying in hot water, allowing to settle and decanting, while maintaining the pH at about 3.0. The final purified carboxymethyl hydroxypropyl cellulose product was roll dried at about 120° C.

*Examples 2 and 3.—Carboxymethyl hydroxypropyl cellulose*

These two experiments were carried out using the same conditions as in Example 1, except that carboxymethyl cellulose of different D.S. values was used in order to obtain carboxymethyl hydroxypropyl cellulose of different carboxymethyl D.S. values.

*Example 4.—Diethylaminoethyl hydroxypropyl cellulose*

This experiment was carried out using the same conditions as in Example 1, except that diethylaminoethyl cellulose was hydroxypropylated and except that the diethylaminoethyl hydroxypropyl cellulose product was purified at pH 7. The diethylaminoethyl cellulose in this example and elsewhere herein was prepared in accordance with Vaughan U.S. Patent No. 2,623,042.

*Example 5.—Carboxyl hydroxypropyl cellulose*

This experiment was carried out using the same conditions as in Example 1, except that carboxyl cellulose was hydroxypropylated. The carboxyl cellulose was prepared in accordance with Kenyon and Yackel U.S. Patent No. 2,448,892.

Further details of Examples 1–5 appear in Table 1 hereinafter.

TABLE 3
[2-Step reaction]

| Example No. | Ionic DS | HP MS | 2% Aqueous Solution | | |
|---|---|---|---|---|---|
| | | | Viscosity, cp. | pH | Opaque Temp., °C. |
| 1 | 0.18 CM | 4.2 | 9.5 | 2.7 | 40 |
| | | | | 3.9 | 51 |
| | | | | 5.0 | >97 |
| | | | | 7.0 | >97 |
| | | | | 9.0 | >97 |
| 2 | 0.04 CM | 4.2 | 25 | 3.2 | 40 |
| | | | | 7.2 | 75 |
| 3 | 0.48 CM | 4.5 | 34 | 2.9 | 38 |
| | | | | 4.0 | 78 |
| | | | | 4.9 | >97 |
| | | | | 7.0 | >97 |
| 4 | 0.165 DEAE | 3.7 | 12.5 | 3.1 | 73 |
| | | | | 7.05 | 51 |
| 5 | 0.047 COOH | 3.8 | 42.5 | 3.05 | 45 |
| | | | | 7.1 | 61 |

Examples 1–5 hereinbefore illustrate preparing mixed cellulose derivatives of the present invention by a 2-step reaction, i.e. by introducing into cellulose an ionic substituent to a low D.S. and then hydroxypropylating said ionic cellulose derivative. Another method of preparing the mixed cellulose derivatives of the present invention comprises introducing the ionic and the hydroxypropyl substituents in a 1-step reaction, i.e. in the same operation. The following Examples 6–22 illustrate the 1-step reaction. These examples also show the introduction of various other ionic substituents.

EXAMPLES 6–11—1-STEP REACTION

*Example 6.—Carboxymethyl hydroxypropyl cellulose*

One part finely divided wood pulp was slurried in 6.6 parts hexane and 0.165 part water. A solution of 0.04 part MCA dissolved in 2.35 parts TBA was added to the resulting slurry. Then 0.25 part of 50% NaOH was added to the slurry and the slurry stirred one hour. The slurry was transferred to a pressure vessel and 3.0 parts propylene oxide added to the slurry and heated 16 hours at 70° C. Agitation was employed throughout the process. These carboxymethyl hydroxypropyl cellulose products were purified and dried under the same conditions of Examples 1–3. Further details appear in Table 2 hereinafter.

*Examples 7–11.—Carboxymethyl hydroxypropyl cellulose*

These examples were carried out under the same conditions as Example 6 except the amount of MCA was varied in order to obtain carboxymethyl hydroxypropyl cellulose products having different carboxymethyl D.S. values. Further details appear in Table 2 hereinafter.

TABLE 2
[1-Step reaction]

| Example No. | Weight Ratios to Air-Dry Cellulose [1] | | | HP MS | CM DS | Aqueous Solutions | | | |
|---|---|---|---|---|---|---|---|---|---|
| | $H_2O$ | NaOH | MCA | | | Concn., percent | Viscosity, cp. | pH | Opaque Temperature, °C.[2] |
| 6 | 0.30 | 0.124 | 0.025 | 4.2 | 0.04 | 2 | 37.5 | 3.4 | 43 |
| | | | | | | | | 5.1 | 50 |
| | | | | | | | | 7.0 | 52 |
| 7 | 0.31 | 0.135 | 0.04 | 4.2 | 0.07 | 2 | 41 | 2.9 | 43 |
| | | | | | | | | 5.0 | 59 |
| | | | | | | | | 7.1 | 64 |
| 8 | 0.30 | 0.180 | 0.09 | 3.5 | 0.16 | 1 | 240 | 3.6 | 45 |
| | | | | | | | | 5.0 | 75 |
| | | | | | | | | 7.0 | 81 |
| 9 | 0.40 | 0.195 | 0.11 | 4.2 | 0.18 | 2 | 25 | 2.85 | 44 |
| | | | | | | | | 4.05 | 71 |
| | | | | | | | | 5.05 | 97 |
| 10 | 0.40 | 0.238 | 0.15 | 4.4 | 0.26 | 2 | 1,100 | 3.2 | 47 |
| | | | | | | | | 3.4 | 6.5 |
| | | | | | | | | 5.0 | >97 |
| | | | | | | | | 7.0 | >97 |
| 11 | 0.40 | 0.274 | 0.20 | 4.1 | 0.30 | 2 | 450 | 3.2 | 48 |
| | | | | | | | | 4.0 | 70 |
| | | | | | | | | 5.0 | >97 |
| | | | | | | | | 7.0 | >97 |

[1] The propylene oxide/cellulose ratio was 3.0 in Examples 6–11.
[2] The opaque temperature of unmodified hydroxypropyl cellulose is approximately 40° C.–45° C.

The following Examples 12–22 illustrate preparation of mixed cellulose derivatives of the present invention by the 1-step reaction employing several other reagents which impart ionic character to the derivatives. In Examples 12–16, carboxyethyl ionic substituent was introduced to varying D.S. and various reagents were used for this purpose.

The following was the procedure employed in these Examples 12–22. To a slurry of one part cellulose, 8.6 parts hexane and 2.35 parts t-butanol, a variable amount of water and ionic reagent was stirred at room temperature. To the resulting slurry was added 50% NaOH aqueous slurry in an amount such that 0.1 part of 100% NaOH would be present in the reaction mixture in excess of the amount consumed during the reaction. The water/cellulose ratio, including the water in the 50% NaOH, amounted to approximately 0.4. After the slurry was stirred one hour at room temperature, 3 parts propylene oxide was added. The reaction mixture was heated with agitation for 16 hours at 70° C.

The mixed cellulose derivatives prepared in accordance with these Examples 12–22 were purified as set forth in Example 1 hereinbefore, except that the diethylaminoethyl hydroxypropyl cellulose product was purified at pH 7.

Further details of Examples 12–22 appear in Table 3 hereinafter.

The log of flow was plotted in inches per two minutes against $1/T_A$, i.e. against the reciprocal of the absolute temperature, giving a straight line. From this line was read off the temperature at which the product flowed one inch in two minutes at 500 p.s.i. Further details appear in Table 4 hereinafter.

TABLE 4
[Plastic flow]

| Product of Example No. | HP MS | CM DS | Tinius-Olsen Flow Temp., ° C. at 500 p.s.i. |
|---|---|---|---|
| 7 | 4.2 | 0.07 | 134 |
| 9 | 4.2 | 0.18 | 142 |

Like the unmodified hydroxypropyl cellulose defined herein, the modified hydroxypropyl cellulose derivatives of the present invention are soluble in a number of polar organic solvents. These include, e.g., methanol, ethanol, dimethyl sulfoxide, dimethyl formamide, ethylene chlorohydrin, and formic acid.

The ionic D.S. and the hydroxypropyl M.S. values of the mixed cellulose derivatives of the present invention are important. The hydroxypropyl M.S. must be at least TABLE 3
[1-Step reaction]

| Example No. | Ionic Cellulose Derivative | Ionic Reagent, g./g. cellulose | 2% Aqueous Solution ||| Ionic[1] D.S. |
|---|---|---|---|---|---|---|
| | | | Visc., cp. | pH | Opaque Temp., ° C. | |
| 12 | Carboxyethyl cellulose | β-Chloropropionic acid 0.025 | 37.5 | 7.1 | 73 | 0.03 |
| 13 | do | β-Chloropropionic acid, 0.05 | 3,250 | 7.1 | >98 | 0.05 |
| 14 | do | Acrylonitrile, 0.04 | 970 | 7.0 | >98 | 0.04 |
| 15 | do | Acrylamide, 0.05 | 2,200 | 7.05 | >98 | 0.08 |
| 16 | do | Methyl acrylate, .05 | 205 | 7.05 | 92 | 0.05 |
| 17 | α-Methyl carboxymethyl cellulose | α-Chloropropionic acid, .05 | 190 | 7.05 | 86 | 0.07 |
| 18 | Sulfoethyl cellulose | Sodium vinyl sulfonate, 0.13 | 570 | 7.0 | 59 | 0.03 |
| 19 | do | Sodium β-chloroethyl sulfonate, 0.05 | 2,000 | 7.1 | 98 | 0.008 |
| 20 | Sulfopropyl cellulose | Propanesultone 0.06 | 320 | 7.0 | 71 | 0.013 |
| 21 | Sulfate cellulose | Triethylamine-sulfur trioxide complex, 0.10 | 20 | 7.0 | 64 | 0.017 |
| 22 | Dimethyl aminoethyl cellulose | Diethylaminoethyl-chloride hydrochloride, 0.10 | 408 | 3.05 | >98 | 0.028 |

[1] All products had HP MS values of 3.5–4.5.

Both diethylaminoethyl hydroxypropyl cellulose and dimethylaminoisopropyl hydroxypropyl cellulose of substantially the same substitution values as the dimethyl aminoethyl hydroxypropyl cellulose of Example 22 in Table 3 hereinbefore were prepared using the conditions of Example 22, except employing different aminoalkylation reagents. These latter two mixed celloluse derivatives also possess the same desirable properties including substantially increased opaque temperature, of the Example 22 product.

The modified hydroxypropyl cellulose derivatives of the present invention retain most of the thermoplasticity of the unmodified hydroxypropyl cellulose defined herein. Thermoplasticity of the carboxymethyl hydroxypropyl cellulose products of Examples 7 and 9 hereinbefore was determined as follows under the application of heat and pressure in an Olsen Bakelite flow tester. This is a standard testing device widely used in the plastics industry. It is described in ASTM method D569–46A (ASTM Standards, 1958, Part 9, page 393). This device is perhaps more often referred to in the art as the Tinius-Olsen flow tester. The carboxymethyl hydroxypropyl cellulose was ground to a fine powder and conditioned over $CaCl_2$ and therefore was substantially bone dry when tested. Cylindrical pellets ⅜″ x ⅜″ were formed from this powder in a pelleting machine. The pellet was placed in the Tinius-Olsen flow tester and the plastic flow thereof measured.

2, preferably 3–10, 4 being specifically preferred. Hydroxypropyl cellulose having an ionic D.S. value even as low as 0.001 has an opaque temperature noticeably higher than said hydroxypropyl cellulose without the ionic substituent. Increasing the ionic D.S. of said hydroxypropyl cellulose increases the opaque temperature. In some cases an ionic D.S. of only 0.04 increased the opaque temperature to substantially the boiling point of water (i.e. to about 100° C.). An ionic D.S. range of 0.001–0.4 is operable in accordance with the present invention but a range of 0.01–0.2 is preferred.

The particular manner of introducing the ionic substituent is not per se a part of the present invention; in fact, it is not critical and any conventional process is applicable. Various methods are known in the prior art for accomplishing this.

An important and unexpected aspect of the present invention is that reacting cellulosic material with a hydroxypropylating agent and an ionic agent to a low ionic D.S. gives a mixed cellulose derivative which is soluble in water to a substantially higher temperature than unmodified hydroxypropyl cellulose when these ionic substituent groups are in the salt form. When the ionic substituent groups are present mainly in the nonsalt form, then the mixed cellulose derivative is substantially insoluble in hot water and may be purified with hot water during its preparation. In practice this means that during preparation the pH of the mixed derivative is adjusted to a low level of about 2–3 for those containing certain ionic substituents including carboxylic acid, sulfonic acid, phosphate and sulfate, etc. substituents. On the other hand, the amine type mixed cellulose derivatives including dialkylaminoalkyl hydroxypropyl cellulose are best purified at a pH of about 7 because at low pH this type forms acids salts which are water-soluble at elevated temperatures. The pH may be decreased by employing any suitable acid and the pH may be raised by employing compounds which will supply ions of alkali metals. For instance, hydrochloric acid, phosphoric acid, acetic acid, sodium bicarbonate, sodium hydroxide and potassium hydroxide are quite suitable for adjusting the pH to the desired value.

Another important and unexpected property is the variation of the aqueous viscosity of these products with temperature. This may be studied by means of the Brabender Viscograph which records the viscosity continuously as the temperature is raised from 25° C. to 97° C. at the rate of 1.5° C. per minute. With unmodified hydroxypropyl cellulose there is a normal decrease in viscosity as the temperature increases followed by an abrupt disappearance of viscosity at 40° C.–45° C., the temperature at which precipitation occurs. With the modified hydroxypropyl celluloses of this invention, the viscosity behavior at pH levels where the product remains soluble varies depending on the ionic substitution, pH, solution concentration, molecular weight of the product, and rate of shear. In some cases, the decrease in viscosity with temperature is similar to that of a water-soluble polymer which exhibits no insolubility in hot water. In other cases, the viscosity does not drop as rapidly. In some instances, the viscosity temperature curve goes through a minimum and over a certain temperature range the viscosity increases with temperature. In extreme cases, the viscosity at some elevated temperature may be many times the viscosity at room temperature. An interesting and unusual property of aqueous solutions of the mixed cellulose derivatives of the present invention is that as the temperature is lowered, the curves are generally reversible. This frequently is not the case with solutions of other water-soluble polymers which gel on heating.

The presence of very small amounts of an ionic substituent has a surprisingly large effect on the solubility in hot water and consequently on the solution viscosity. This effect is greatest when the ionic substituent is in its most highly ionized state and the effect is very slight or nonexistent when the substituent is relatively un-ionized. Consequently, this behavior is strongly influenced by pH. The effect of pH on the different classes of substituents is as follows.

*Carboxylic acids.*—These include carboxyl cellulose and carboxyalkyl cellulose. Carboxylic acids are comparatively weak and at low pH levels are very slightly ionized but at pH levels above 5, where they are in the salt form, they are highly ionized. These derivatives are therefore quite soluble in hot water at pH levels above 5 but are insoluble in hot water at pH levels of 3 or less. They may be purified in hot water at the low pH levels. Solubility of these products in water at 40° C. or less is of course good regardless of pH.

*Dialkylaminoalkyl hydroxypropyl cellulose derivatives.*—At neutral or higher pH levels these derivatives are substantially nonionic and are insoluble in hot water. They do become ionic at low pH levels as shown by the following equation:

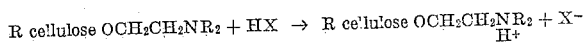

and are consequently soluble in hot water. They are best purified in hot water at a pH of about 7.

*Sulfonic acid and sulfates.*—These are stronger acids and therefore their solubility is less sensitive to variations in pH. They are best purified at very low pH values.

Although not necessary, purification of the products of the present invention is facilitated by washing with dilute aqueous salt solution, e.g. 1% sodium chloride, instead of water alone. This has a flocculating and/or salting out effect on the products and facilitates handling. Purification with aqueous salt solutions is especially beneficial with products containing the higher amounts of ionic substituent.

From the foregoing temperature-viscosity disclosure regarding the products of this invention it will be apparent that by proper control of conditions it is possible to thicken compositions when the temperature is raised. The utility of this desirable property will be illustrated hereinafter.

It has been mentioned hereinbefore (pages 2 and 16) that while unmodified hydroxypropyl cellulose as described and claimed in my copending application identified on page 2 hereof has many desirable properties, it is not applicable where realizing the benefits of these properties depends on the unmodified hydroxypropyl cellulose being in aqueous solution at temperatures above about 40° C.–45° C. because it precipitates out of solution above this temperature (herein and in said copending application referred to as its opaque temperature). These uses includes, e.g., those in which it is desired to use the hydroxypropyl cellulose as a thickener, a stabilizer or surfactant at elevated temperature such as, e.g., in paints, adhesives and foods. By modifying said hydroxypropyl cellulose in accordance with the present invention the opaque temperature is raised so that the modified hydroxypropyl cellulose is applicable in fields of the type enumerated.

As many apparent and widely different embodiments of this invention may be made without departing from the spirit and scope thereof, it is to be understood that the invention is not limited to the specific embodiment thereof except as defined in the appended claims.

What I claim and desire to protect by Letters Patent is:

1. Process of preparing a mixed cellulose derivative comprising mixing cellulosic material, alkali, water and a water miscible inert organic diluent, and then causing the alkali cellulose to react with hydroxypropylating agent and a second agent which imparts ionic character to the cellulose derivative, continuing the reaction until said derivative has a hydroxypropyl M.S. and an ionic D.S. of at least 2 and 0.001–0.4, respectively the alkali/cellulose ratio being 0.02–0.5, the water/cellulose ratio being 0.1–4 and 0.1–2 in the alkali cellulose period and etherification period, respectively.

2. Process of claim 1 wherein said second agent is an etherifying agent.

3. Process of claim 2 wherein said etherifying agent is carboxyalkylating agent.

4. Process of claim 2 wherein said etherifying agent is dialkylaminoalkylating agent.

5. Process of claim 2 wherein said etherifying agent is sulfoalkylating agent.

6. Process of claim 1 wherein said second agent is an esterifying agent.

7. Process of claim 6 wherein said esterifying agent is sulfating agent.

8. As a new compound hydroxypropyl cellulose containing ionic substituent having a hydroxypropyl M.S. of at least 2 and an ionic M.S. of 0.001–0.4, which is thermoplastic, soluble in cold water and polar organic solvents, said new compound also being soluble in hot water to a substantially higher temperature than unmodified hydroxypropyl cellulose which has an M.S. of at least 2 and is thermoplastic, soluble in cold water and polar organic solvents.

9. Compound of claim 8 wherein the ionic substituent is ether substituent.

10. Compound of claim 9 wherein the ether substituent is carboxyalkyl ether substituent.

11. Compound of claim 9 wherein the ether substituent is dialkylaminoalkyl substituent.

12. Compound of claim 9 wherein the ether substituent is sulfoalkyl substituent.

13. Compound of claim 8 wherein the ionic substituent is ester substituent.

14. Compound of claim 13 wherein the ester substituent is sulfate substituent.

References Cited

UNITED STATES PATENTS

| | | | |
|---|---|---|---|
| 2,618,632 | 11/1952 | Klug | 260—231 |
| 2,591,748 | 4/1952 | Vaughan | 260—231 |
| 2,132,181 | 10/1938 | Neugebauer | 260—931 XR |

DONALD E. CZAJA, *Primary Examiner.*

LEON J. BERCOVITZ, *Examiner.*

R. W. MULCAHY, *Assistant Examiner.*